(12) United States Patent
McLeod

(10) Patent No.: US 10,794,052 B2
(45) Date of Patent: Oct. 6, 2020

(54) CUP AND SAUCER THINSET SURFACE DRAIN

(71) Applicant: Christopher Adam McLeod, Toronto (CA)

(72) Inventor: Christopher Adam McLeod, Toronto (CA)

(73) Assignee: Christopher Adam McLeod, Toronto, Ontario (CA)

( * ) Notice: Subject to any disclaimer, the term of this patent is extended or adjusted under 35 U.S.C. 154(b) by 85 days.

(21) Appl. No.: 15/891,355

(22) Filed: Feb. 7, 2018

(65) Prior Publication Data

US 2019/0242107 A1 Aug. 8, 2019

(51) Int. Cl.
*E03F 5/04* (2006.01)
*E03F 5/06* (2006.01)
*E03F 5/042* (2006.01)

(52) U.S. Cl.
CPC ............ *E03F 5/0408* (2013.01); *E03F 5/042* (2013.01); *E03F 5/0407* (2013.01); *E03F 5/0409* (2013.01); *E03F 5/06* (2013.01); *E03F 2005/0413* (2013.01); *E03F 2005/0415* (2013.01); *E03F 2005/068* (2013.01)

(58) Field of Classification Search
CPC ..... E03F 5/0408; E03F 5/0407; E03F 5/0409; E03F 5/042; E03F 5/06; E03F 2005/0413; E03F 2005/0415; E03F 2005/068
USPC ............. 137/362; 4/613, 584, 612, 679, 680
See application file for complete search history.

(56) References Cited

U.S. PATENT DOCUMENTS

| 4,067,072 | A | * | 1/1978 | Izzi | E03F 5/0407 285/12 |
| 4,694,513 | A | * | 9/1987 | Kiziah | E03F 5/0408 285/136.1 |
| 5,372,715 | A | * | 12/1994 | Maggard | E03F 5/0408 210/164 |
| 8,925,123 | B2 | * | 1/2015 | DeGooyer | E03F 5/0408 4/287 |
| 2007/0056088 | A1 | * | 3/2007 | DeGooyer | E03C 1/20 4/613 |
| 2010/0170035 | A1 | * | 7/2010 | Kik, Sr. | A47K 3/40 4/613 |
| 2014/0131996 | A1 | * | 5/2014 | Murphy | E03F 5/0409 285/136.1 |
| 2014/0157514 | A1 | * | 6/2014 | Cook | E03F 5/0408 4/679 |

(Continued)

Primary Examiner — Justin M Jonaitis
(74) Attorney, Agent, or Firm — Perry + Currier Inc.; Matthew J. Marquardt

(57) ABSTRACT

A thinset floor drain comprises a saucer shaped mounting flange with a central lowermost circular perforated receptacle, and a perforated cup of smaller diameter that sits in the receptacle. The cup bears upward features including a grate support that threads into the inner thread of the cup, a grate that sits atop the upmost flange of the grate support, and grate tilting mechanisms. This structure serves not only as a flanged floor drain to drain surface water through the cylindrical core of the drain, it binds to a membrane beneath tiling and collects weeping water. The horizontal, vertical, and tilt adjustability of the upmost grate provide a safe grate surface that aligns with and is coplanar with the tile surface surrounding it. Because the receptacle sits below the subfloor, the grate will present a low profile above the surface of the subfloor.

3 Claims, 10 Drawing Sheets

(56) References Cited

U.S. PATENT DOCUMENTS

2015/0275497 A1\* 10/2015 Nyce .................... E03F 5/0407
    52/302.1

\* cited by examiner

CUP AND SAUCER THINSET SURFACE DRAIN

CROSS-REFERENCE TO RELATED APPLICATIONS

No cross reference is made to other applications.

STATEMENT REGARDING FEDERALLY SPONSORED RESEARCH OF DEVELOPMENT

No Federal Government support was received in the development of this Invention.

SEQUENCE LISTING, TABLE, OR COMPUTER PROGRAM LISTING

No sequence listing, table, or computer program is attached or accompanies this Application.

FIELD OF THE INVENTION

The present invention relates generally to wet room drains, and more particularly to tile shower drains that integrate membrane as a means of waterproofing wet room tile floors while providing drainage for surface water. A tile shower drain is a device mounted in a tile wet room floor that drains off shower water collecting on the surface of the wet room floor, a wet room being a waterproofed bathing room. Waterproofing is effected in a wet room by a system of membranes, mortar, tiles, and spacer material, and more particularly by a membrane. Integration of the membrane into the tiled shower drain refers to the provision of a continuous, waterproof tile surface sloping down to the shower drain, wherein the membrane under the tile is attached to the drain in such a way that water does not egress to below the membrane and beyond to the fabric of the building. Further, wet room floor drains must not protrude above the level of the tiles surrounding the drain.

BACKGROUND OF THE INVENTION

Waterproofing of a wet room is an exercise in preventing the water emanating from a shower or other water supply fittings from entering the fabric of the building and causing damage. The term wet room describes a room where water is supplied into the room using piping for purposes of bathing and exits the building using piping to a plurality of sewerage drain options. Common waterproofing components of the floor of a membrane to ensure water does not instead drain into the fabric of the building include a drain fitting, membrane, mud or mortar, tiles, tile adhesive, and grouting. A drain fitting comprises a flanged pipe for concentric attachment at the lower, unflanged, end to a drainage pipe attached to a downstream underlying sewer system, with the flange on the upper end of the drain resting on one of a plurality of floor perforations. A membrane is a sheet of waterproof material applied as a solid sheet cut to fit, or as a liquid drying to a solid. Mud refers to a shapeable, self-drying, viscous mortar used to build a sloped base for the application of tiles. Mortar itself is a viscous mixture that holds shape until it dries solid, allowing for the formation of sloped surfaces. Mortar typically is not waterproof, and does not form a barrier to water flow. Tile adhesive adheres the underside of tiles to mud or membrane, depending on the tiling system used. Tiles are planar ceramic or plastic polygonal components that play a decorative and hygienic role and help to protect the underlying mud or mortar from impact and water. Grouting or grout fills the spaces between tiles to add to the waterproof nature of the upmost tiled surface. While tiles may be waterproof, grouting is a poor barrier against water flow. A sub-floor refers to the unfinished lowermost flooring underlying tile systems, typically made of plywood. Wet room drains include but are not restricted to shower drains located in showering spaces, other examples being wet room drains to receive bath tailpieces, where the tailpiece is a vertically suspended brass tube emanating from the bath waste fitting, or toilet horns, where a toilet horn is a vertically suspended drain pipe bottommost to the toilet body, and floor drains, which simply drain water from the floor. With the rise of a diversity of water supply fittings in the wet room, the wet room floor drain and the wet room shower drain become one and the same surface drain fitting. Uppermost refers to toward the supply of the water from a faucet or showerhead, lowermost refers to the downstream direction that surface drainage water takes to reach the primary sewer system to which the drain is connected.

In a wet room waterproofing system, the floor drain as installed in the tiled wet room performs two drainage functions, one, grate drainage, and, two, weeping drainage. Grate drainage is achieved through the provision of perforation in the uppermost portion of the drain such that water free-flowing atop the tiles flows down the slopes provided in the tile surface to drain through the uppermost perforation of the drain, through the drain body, and through the building drainage system to the primary sanitary drain serving that building. Said upper perforation of the drain is usually protected by a grate. A drain grate is defined as a generally planar thin fitting that is attached atop the drain perforation. A drain bearing a grate allows the majority of influent water to drain through the grate and downstream to the sewer. A second drainage function is termed weeping. Weeping refers to the relatively smaller flow of water that passes through small cracks in the grout and pores in the tile, and collects at the first waterproof boundary encountered, the membrane. Tiles and grout form an imperfect waterproof barrier in any tiled system. Water draining through imperfections in the grout and tile floor is unavoidable. A floor drain for tiled wet rooms must provide a secondary drainage feature that is seamlessly connected to the first impervious layer, the membrane, to capture and drain weeping water beneath the tiles. This will permit the water that has passed through the tile floor to drain to the sewer.

Floor drain design varies with the system of waterproof wet room construction used for a tiled floor. Two construction systems using components including membranes, mortar, and tiles have evolved: traditional and thinset. Traditional tiled wet room waterproofing systems comprise a waterproof membrane sheet placed directly over the subfloor and linked to a drain mounted to the floor by fasteners. The means by which a membrane is fastened to the floor-mounted portion of the drain includes chemical adherence, or by clamping rings that sandwich the membrane and are fastened by bolts perforating the membrane when passing through the membrane to be tightened in bolt mounts provided on the floor-mounted portion of the floor drain. In the traditional method, mud is then shaped over this membrane to provide slope in the floor promoting the drainage of water toward a centrally placed floor drain. Tile adhesive is applied to the dried mud. Tile is then placed on the adhesive and sealed with grout. This traditional waterproofing system for tiled wet rooms is problematic owing to the lack of bonding between the mud and the subfloor. Cracks developing in the shifting dried mud mass lead to shifting of the overlying tiles leading to subsequent breakage of grouting between the tiles. Water weeping through the tiles accumulates in the mortar above the membrane. Although weeping features are provided in the floor mount of such drains, said weeping features are commonly blocked by the shifted and wetted mud.

In contrast, the thinset waterproofing system employs a range of mud formulations ranging from self-drying liquid mud to stiff shapeable mud, or hard foam, or both, to build a largely waterproof mass that both provides for sloping to a drain mounted directly on the subfloor, this mud bonding directly to the subfloor to control shifting. To this slope an impervious membrane layer is applied or formed chemically. A thin layer of tile adhesive, thinset, is applied to the top of the resulting layered structure, and tiles and grout applied. Water directly flows over the tiles and grout to the grate to drain. Any water weeping through the tile grout layer immediately encounters the membrane overlaying the sloped mud, causing the weeping water to weep toward the drain and drain via weeping features decorating the upper flange of the floor-mounted drain. To minimize the volume of mud applied, the thinset floor drain is mounted as closely as possible to the subfloor and the tiles surrounding the drain are glued just above the membrane, requiring the bulk of the thinset floordrain structure to be below the subfloor. When tiling, the grate integral to the drain structure must have two features to enable final position to be of equal height with, and lined up parallel to, the tiles. The first feature, called vertical adjustability, is the ability to alter the height of the topmost grate relative to the plane of the tile surface, to provide a smooth stepping surface. The second feature, called horizontal adjustability, is the ability to turn or shift the top part of the drain such that the edge of a square grate will be parallel to the edge of the tiles, and the edge of the square grate will line up with the edge of the tiles to provide a visually pleasing appearance. And drainage and weeping drainage must be provided.

This Application describes a novel means of providing said vertical adjustability and horizontal adjustability while maintaining grate drainage and weeping drainage in all configurations. The overall structure of the drain is a moving cup subassembly that sits in a mounted saucer subassembly. The uppermost cup bears the grate and vertical adjustability features. The second, lowermost piece is a mounted membrane adapter saucer containing a central receptacle in which the cup is place with enough clearance to allow the base of the cup to be shifted and rotated. The cup subassembly comprises an internal thread mating with an externally threaded pipe supporting a flange to which the grate is mounted. In the saucer subassembly, the upper surface of the membrane adapter saucer comprises a band to allow adhesion of the membrane, a peripheral ring of mounting holes through which fasteners are passed to mount the saucer rim to the subfloor, and a peripheral ring of mud grip holes that provide an anchor for liquid membrane when it dries. The lowermost end of the mounted membrane adapter saucer presents a standard size hub for attachment of standard diameter pipe. This assembly allows a membrane to adhere or be adhered to the drain, drain downstream to a sewer system, and present a grate upward that is both coplanar with the tile surface, and lines up with the rows and columns of tiles. Both grate drainage and weeping drainage are also provided. The final action of tiling and grouting restricts further horizontal movement and rotation of the grate; importantly, the sitting of the cup into the saucer receptacle prevents downward movement of the grate if stepped upon.

Culwell (U.S. Pat. No. 8,955,172, Feb. 17, 2015) uses fasteners to fasten the flange of a toilet attachment assembly to the subfloor, overlays with membrane, and clamps the membrane with a clamping ring onto an externally threaded pipe presenting upward from the flange surface of the mounted piece. A fixed height, externally threaded upward pipe may be suitable for toilets but is not useable in floor drains, which have to present an adjustable height above the subfloor. In contrast, when the grate subassembly cup is placed in the receptacle of the mounted membrane adapter saucer as described in the Invention in this Application, the grate can be positioned by means of a threaded mate between an internal thread in the cup, and an externally threaded pipe of the flanged grate support, and the grate will not protrude beyond the height of the tile surrounding the drain, owing to the provision of a hidden thread mate below the surface of the subfloor, again as described in this Application.

Schlueter (U.S. Pat. No. 9,567,738, Feb. 14, 2017) describes a drain utility comprising an flange frame surrounding a drain hub whereby the height of an overlying grate subassembly is adjusted by bolts passing through and engaging the grate subassembly, and contacting a lower inner surface of the frame. In contrast, the Invention presented in this Application separates the grate adjustment and the drain vertical support functions. De Gooyer (U.S. Pat. No. 8,112,827, Feb. 14, 2012) describes a floor drain, comprising a frame surrounding a downstream drain perforation wherein a fastener ring surrounding a grate support subassembly rests on the frame surround and allows vertical adjustment of the grate support subassembly to match tile height. Reliance is made on on-site support of the grate subassembly using mud. If the installer neglects to support the subassembly appropriately with mud, when the shower user steps on the drain, the drain descends to the lowest limit of the drain assembly, leaving a depression in the tile surface. In contrast, the Invention presented in this Application supports the grate subassembly by sitting the grate subassembly cup in the base of the receptacle in the membrane adapter saucer, not allowing downward motion upon the application of force.

Accordingly, the cup and saucer architecture described in this Invention addresses shortcomings in existing, recent, surface drain patents through allowing attachment of membrane for reliable drainage while maintaining full and permanent vertical and horizontal adjustability of the upmost grate.

SUMMARY OF THE INVENTION

A surface drain with a membrane adhesion surface as described in this Application consists of two main subassemblies, a flanged saucer-shaped membrane adapter that is fastened to the subfloor such a central receptacle penetrates downwardly through a hole in the subfloor and the flange presents upward, with the receptacle bearing a central drainage hole completely perforating the adapter, this perforation surrounded by a receptacle flange suspended from the uppermost flange of the membrane adapter saucer. The membrane adapter saucer subassembly is mounted concentric to a hole in the subfloor with fasteners, and a cup subassembly is placed in the central receptacle of the membrane adapter saucer, said cup subassembly comprising a lower, centrally and vertically perforated, internally threaded cup supporting an upper grate support subassembly comprising a flanged externally threaded pipe that engages the cup thread in a vertically adjustable threadmate.

The cup and saucer thinset drain described in this Application provides both drainage functions for wet rooms; that is, the drain comprises a perforation grate that collects the majority of drainage water as well as secondary weeping drainage channels that drain water weeping directly below the tile surface along and above the impervious membrane into the interior of the drain assembly.

DETAILED DESCRIPTION OF THE INVENTION

Figure 1:
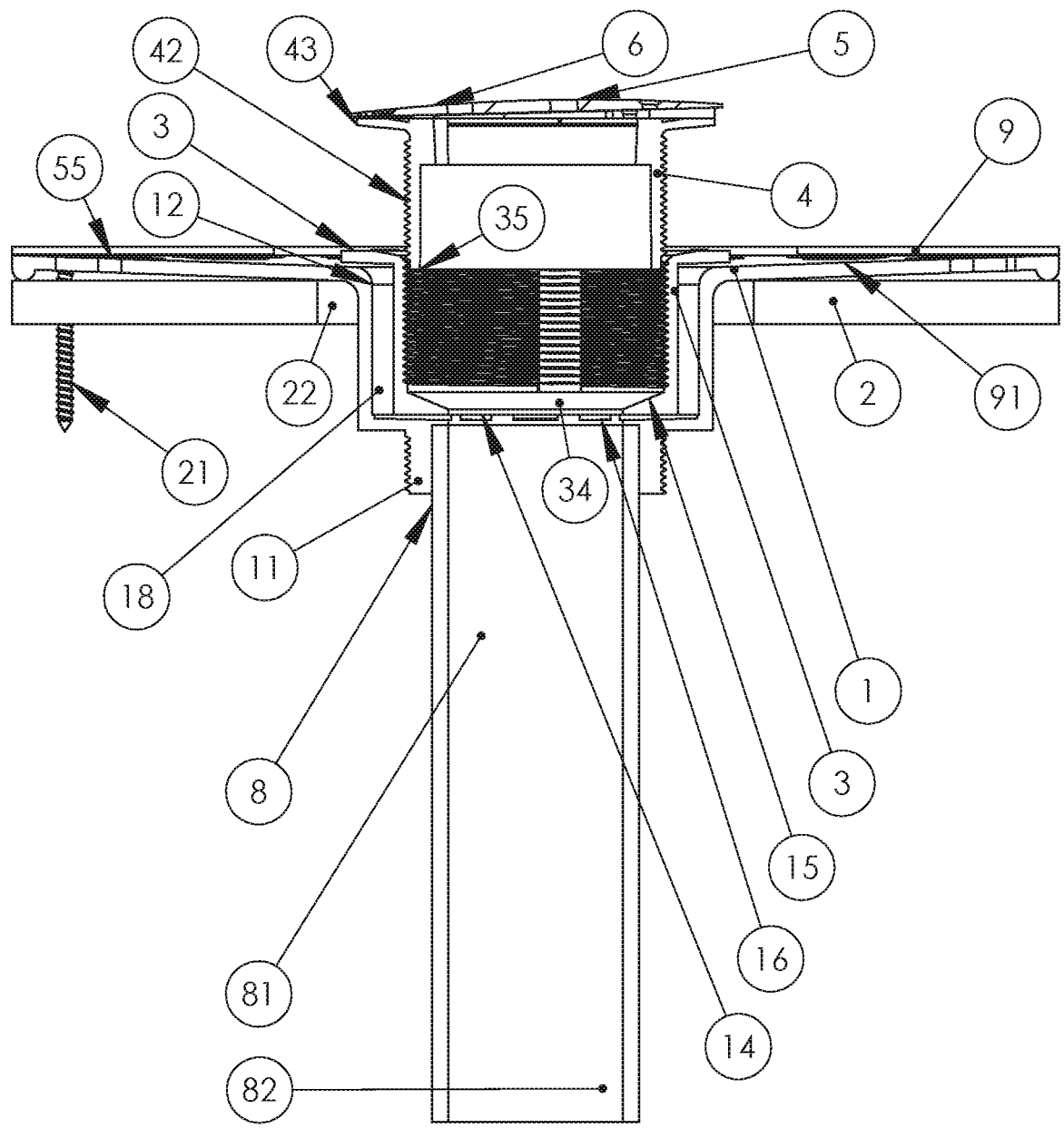
FIG. 1 is vertical section of the entire drain assembly relative to the subfloor in which the drain is mounted.

FIG. 1 presents a vertical cross section of an instance of a full cup and saucer drain assembly. The membrane 9 lies above and upstream of the membrane adapter saucer 1, and is adhered to it at a broad interface band 91. The membrane adapter saucer 1 itself is positioned in an appropriately sized hole 22 in the subfloor 2, and can either be fastened to the subfloor by fasteners 21 through screw holes 15 in the membrane adapter saucer 1, or spaced off the subfloor 2 by the same fasteners 21 by positioning the head of the fastener beneath the membrane adapter saucer 1. The membrane adapter saucer bears other features, including a perforated centered receptacle 18 suspending a lowermost downstream hub 11 in which pipe 8 can be inserted to connect the drainage passage 81 to downstream piping at the downstream end 82 of the pipe 8. Alternatively, an external threadmate 11 connection may be used for a threaded connection. In the internal downstream center of the membrane adapter saucer a drainage perforation 14 is provided, surrounded by a flange 15 with weeping features 16. Flange 15 provides a stable horizontal base for a flat bottomed cup 3 to rest. Cup 3 bears an internal downstream center drainage perforation 34. Cup 3 bears an internal thread 35 into which threads a grate support 4 with an external thread 42. The grate support 4 bears an upper grate support flange 43. Atop the flange 43 a grate 6 may be fastened using a plurality of means. An optional shim 5 can be placed between the grate 6 and the grate support upper flange 43.

Figure 2:
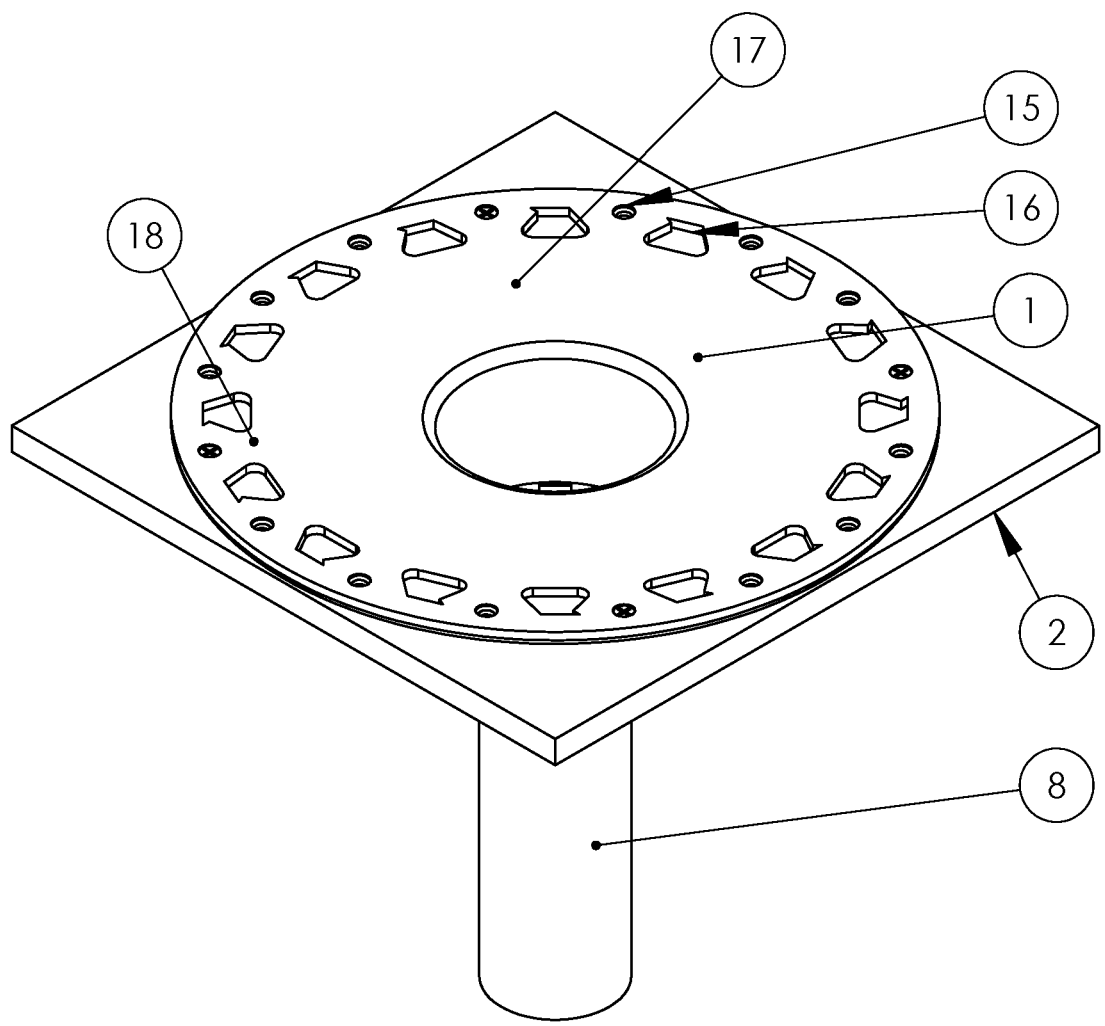
FIG. 2 is an isometric view of the membrane adapter saucer mounted to the subfloor, a drainage pipe suspended from its lowermost hub.

FIG. 2 shows an isometric view of the early stage of installation of the cup and saucer thinset drain. A subfloor 2 is penetrated by a hole into which the membrane adapter saucer 1 is positioned concentrically. A downstream drainage pipe 8 is attached to the downstream hub of the membrane adapter saucer 1 to complete the connection to the downstream drainage system. The upper surface of the membrane adapter saucer bears a broad membrane adhesion area 17, holes 15 which can be used to either fasten the membrane adapter saucer 1 to the subfloor 2, or to space the upper flange 18 higher off the subfloor 2. A plurality of other spacers may be used. Mud grips 16 will grip drying liquid membrane when the liquid membrane is applied to the upper surface 17 instead of a sheet membrane, as well as grips for mud beneath the membrane adapter saucer, depending on the installation method.

Figure 3:
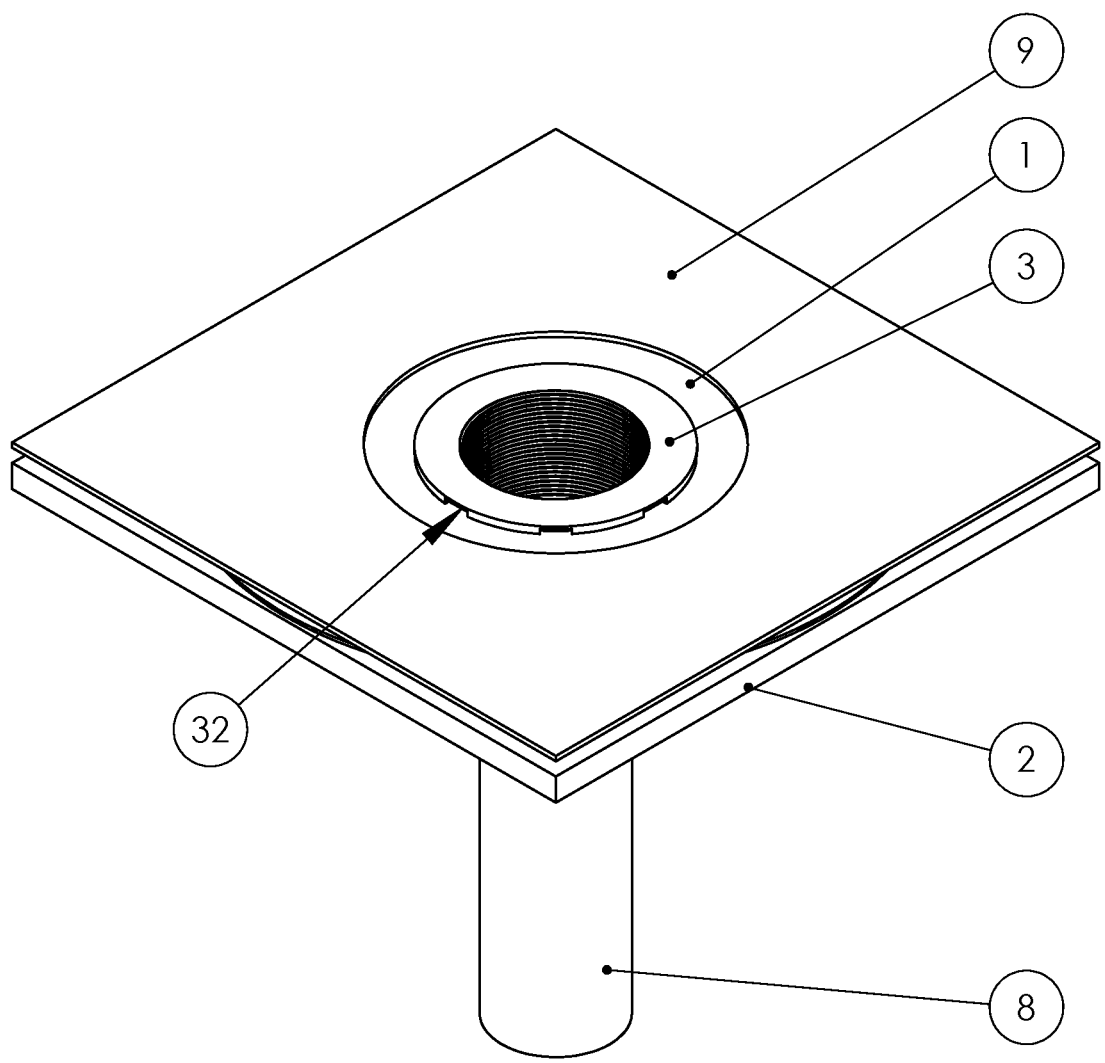
FIG. 3 is an isometric view of the membrane adapter saucer mounted to the subfloor, fitted with membrane adhered to the upper flange of the saucer, a drainage pipe suspended from a lowermost hub of the saucer. An internally threaded cup is placed in the central receptacle of the membrane adapter saucer.

FIG. 3 shows an isometric view of the secondary stage of installation of the cup and saucer thinset drain. A subfloor 2 is perforated and bears concentrically positioned membrane adapter saucer 1. A cup 3 is placed into and hides the center receptacle of membrane adapter saucer. The cup 3 provides horizontal weeping channels 33. The membrane 9 is applied in liquid or sheet form to the upper surface of the upper flange of the membrane adapter saucer 1. A pipe 8 connects the drain to a downstream connection.

Figure 4:
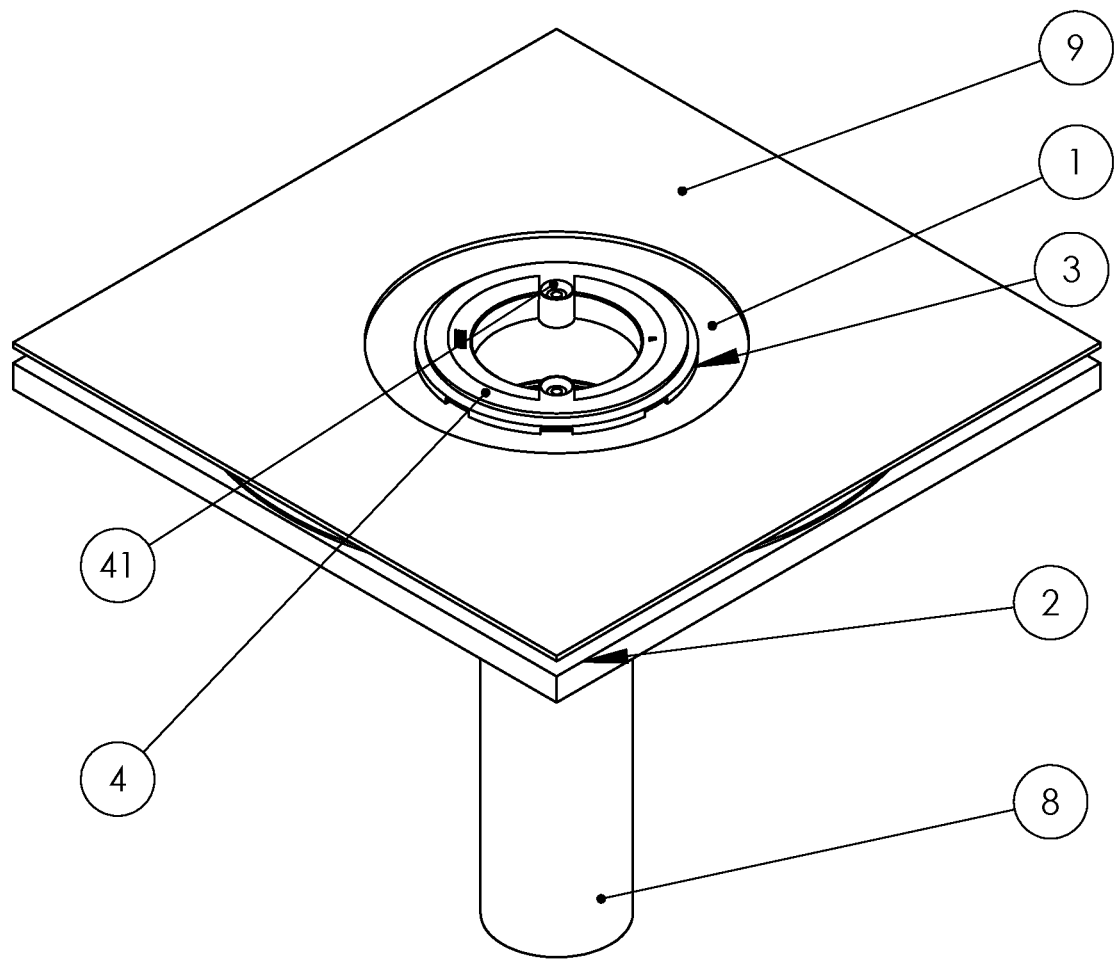
FIG. 4 is an isometric view of the membrane adapter saucer mounted to the subfloor. A flanged externally threaded pipe is threaded into the internally threaded cup.

FIG. 4 shows an isometric view of the first grate stage of installation of the cup and saucer thinset drain. A grate support 4 is threaded into the internal thread of the cup 3. One example of fastener mounts 41 is shown. The membrane 9 is attached to the membrane adapter saucer 1. A pipe 8 connects the drain to a downstream connection.

Figure 5:
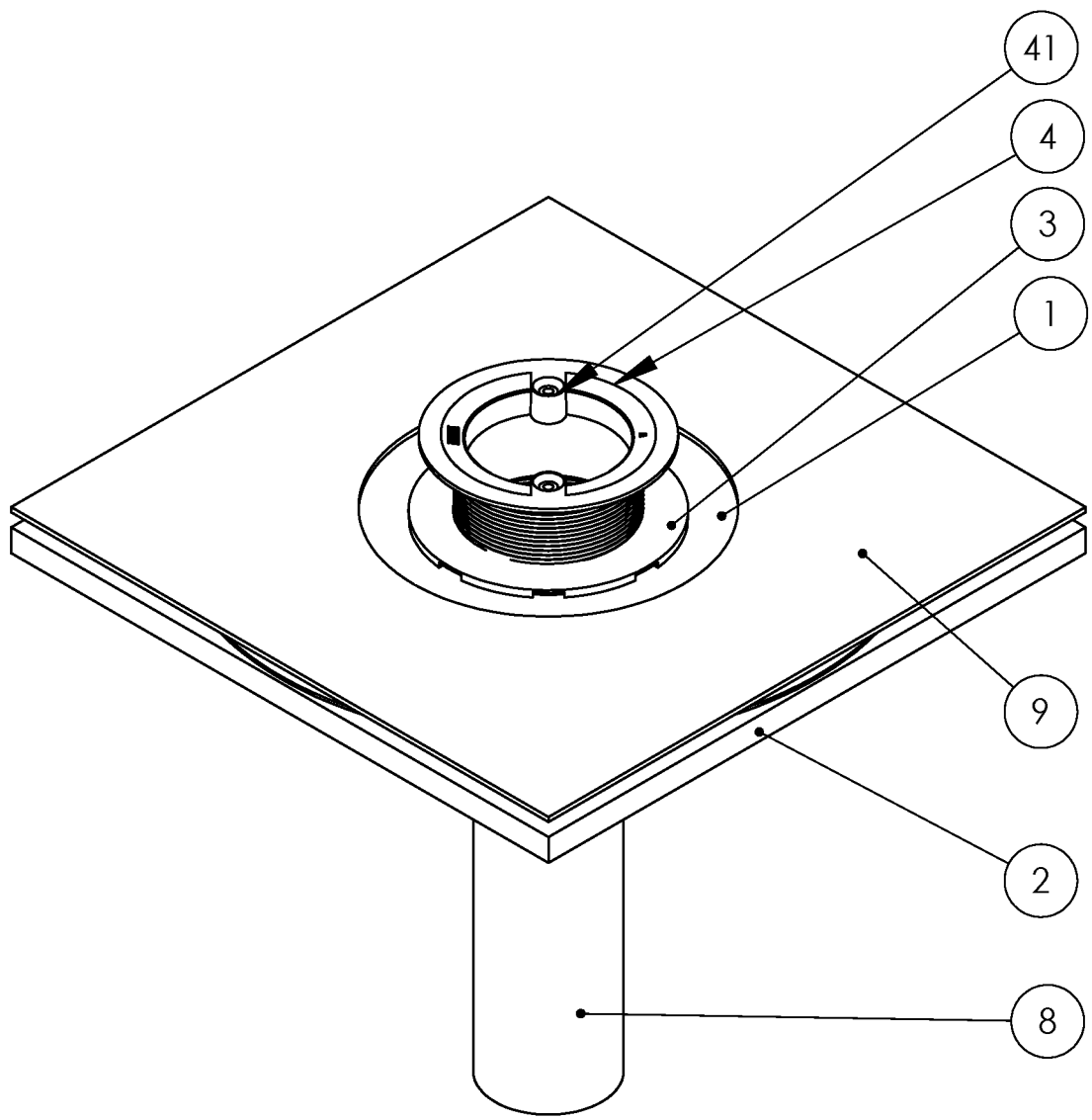
FIG. 5 is an isometric view of the membrane adapter saucer mounted to the subfloor. A flanged externally threaded pipe is threaded upward from the cup into which it is threaded to match the eventual tile surface height.

FIG. 5 shows the same isometric view of the installation as FIG. 4, excepting the grate support has been threaded up to match the eventual height of tiles that will be installed around and sloped to the drain.

Figure 6:
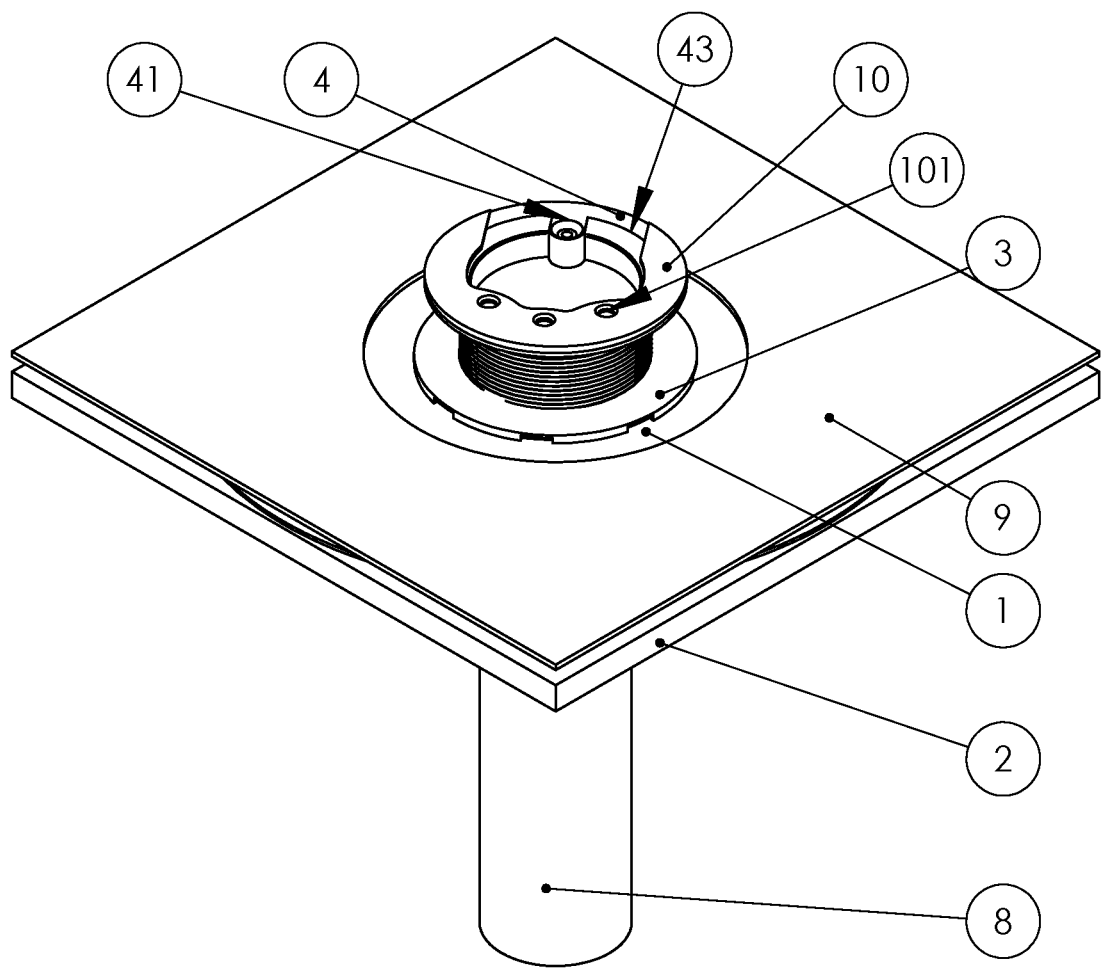
FIG. 6 is an isometric view of the membrane adapter saucer mounted to the subfloor. In this iteration, a shim is attached to the upper surface of the flanged externally thread pipe to allow for tilting of the tile in case the flange surface is not coplanar with the tile surface.

FIG. 6 shows the same isometric view of the installation as FIG. 5, with the addition of a shim 10 that can be applied to the grate support flange 43 in a plurality of orientations to match a tilt in the surface of tiles eventually surrounding the drain. The shim 10 has fastener mounts 101 that match the orientation of fastening features 41 in the flange support 4.

Figure 7:
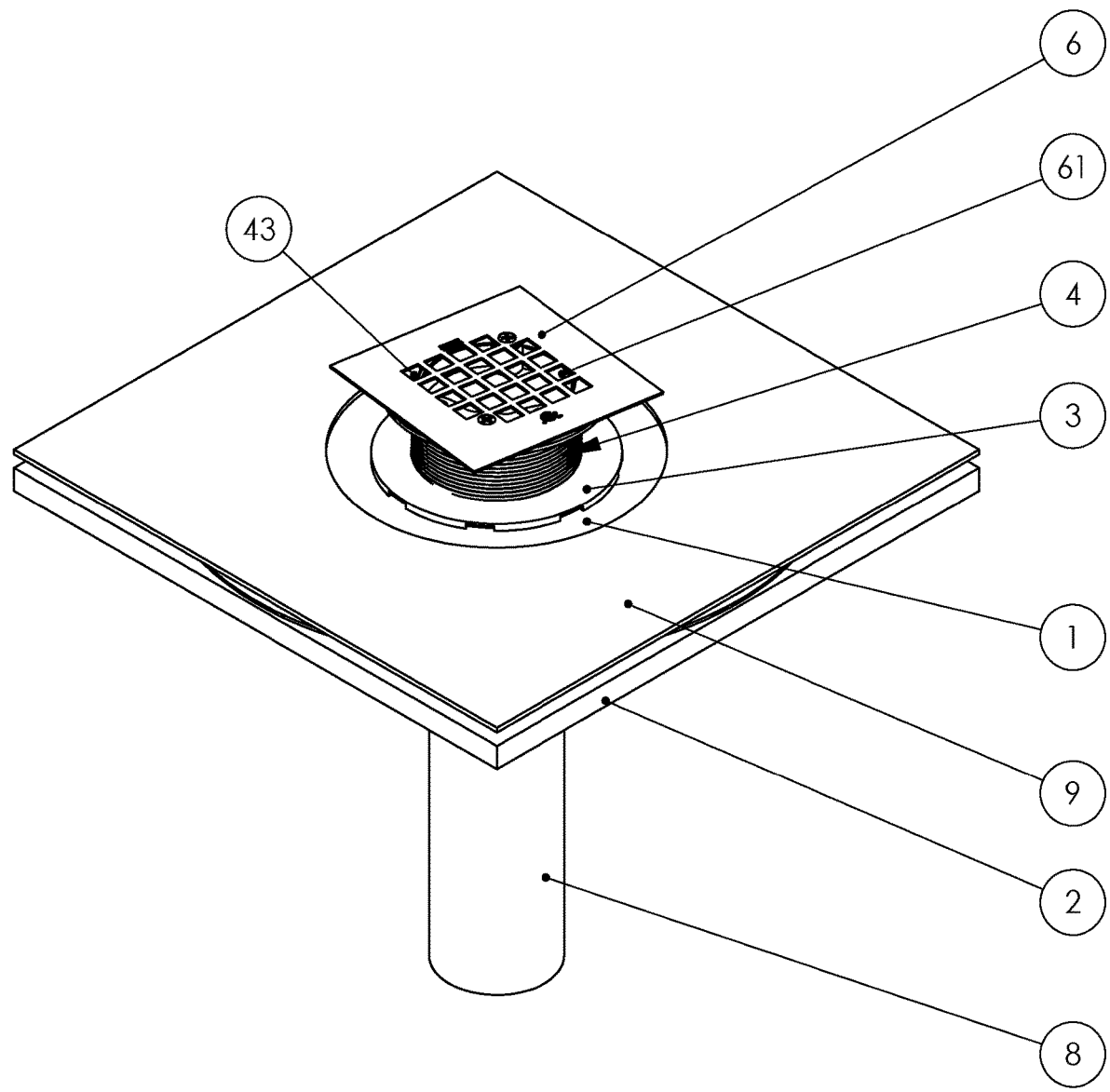
FIG. 7 is an isometric view of the membrane adapter saucer mounted to the subfloor. A grate is fastened to the upper surface of the flange of the grate support subassembly cup.

FIG. 7 shows the same isometric view of the installation as FIG. 6, with the addition of a grate 6 that attached to the uppermost horizontal flange 43 of the grate support 4. Perforations 61 in the grate 6 allow for water ingress into the interior of the drain.

Figure 8:
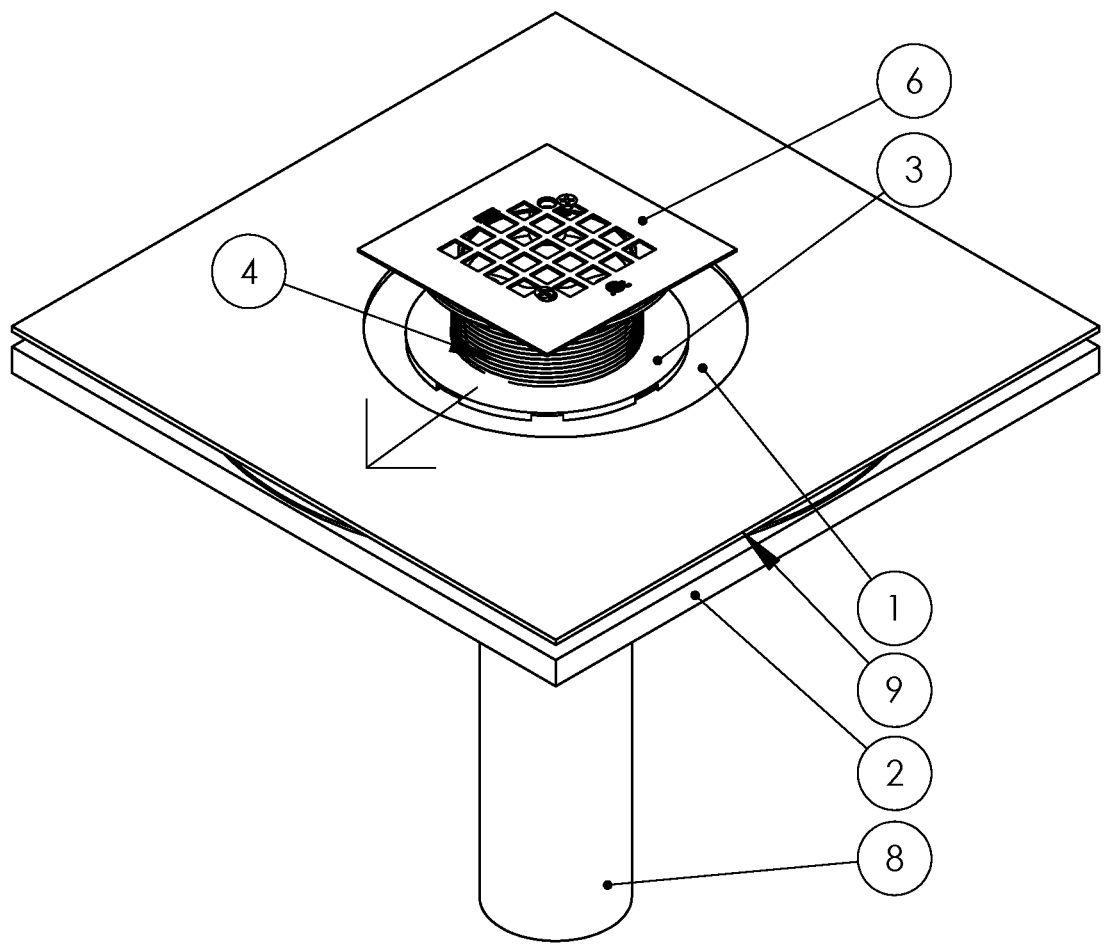
FIG. 8 is an isometric view of the membrane adapter saucer mounted to the subfloor. The entire cup subassembly has been shifted in the horizontal plane to line up the grate with the rows and columns of tiles.

FIG. 8 shows an isometric view of the installation as in FIG. 6, with the important difference that the entire assembly comprising the cup 3, the grate support 4, the grate 6 with optional shim, has been shifted as indicated by the arrow in a direction in the horizontal plane. This is important when lining up with tile rows and columns.

Figure 9:
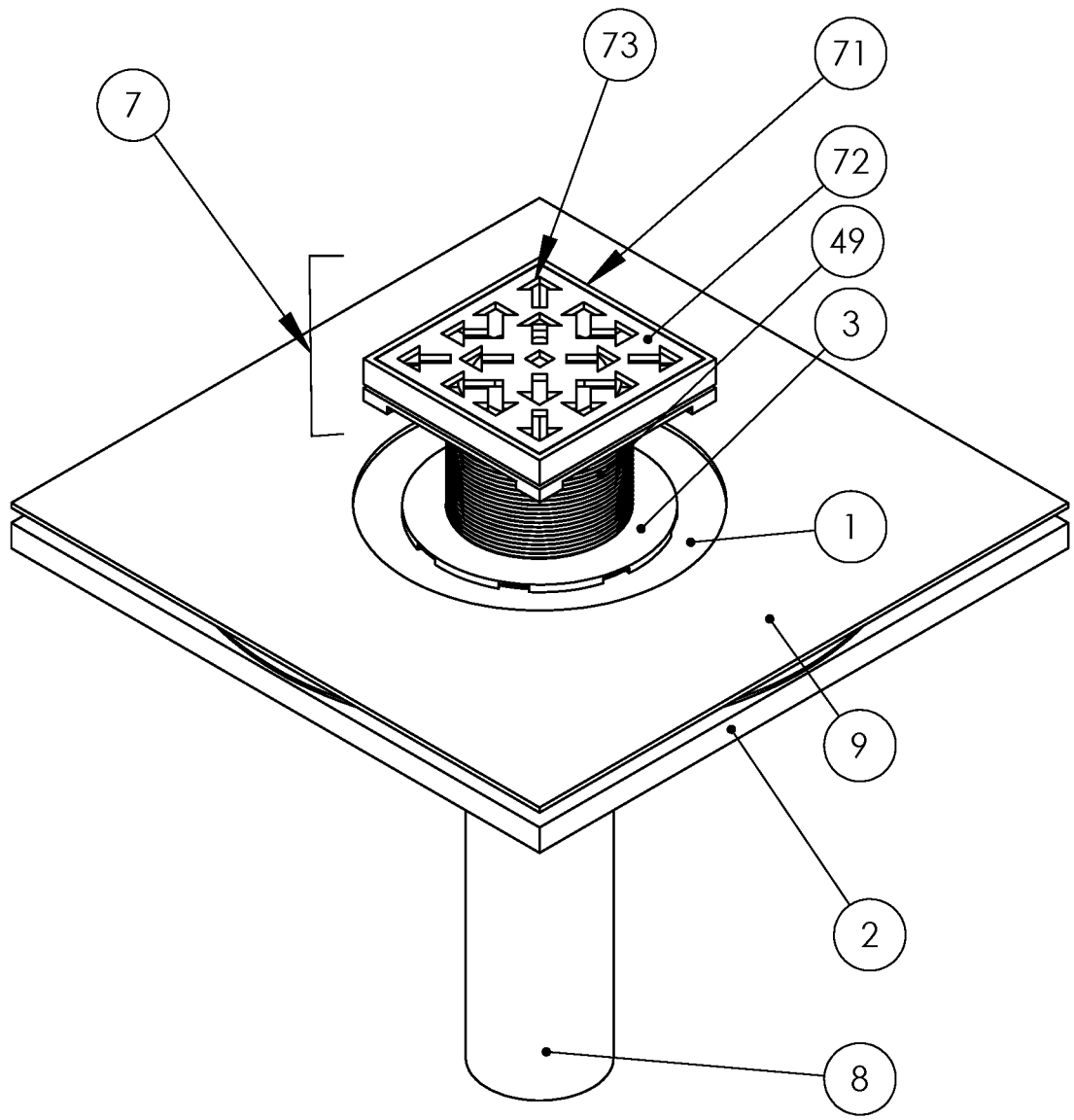
FIG. 9 is an isometric view of the membrane adapter saucer mounted to the subfloor. In this instance the grate is replaced with a grate subassembly with a bordered grate assembly.

FIG. 9 shows an alternate instance of the cup and saucer thinset drain assembly in an isometric view. While components including the downstream pipe 8, the subfloor 2, the membrane adapter saucer 1, and the cup 3 are unchanged, a grate support 49 bears a bordered tiltable grate assembly 7, comprising a grate border 71, a grate insert 72, and grate perforations 73 for drainage of surface water into the interior of the drain assembly.

Figure 10:
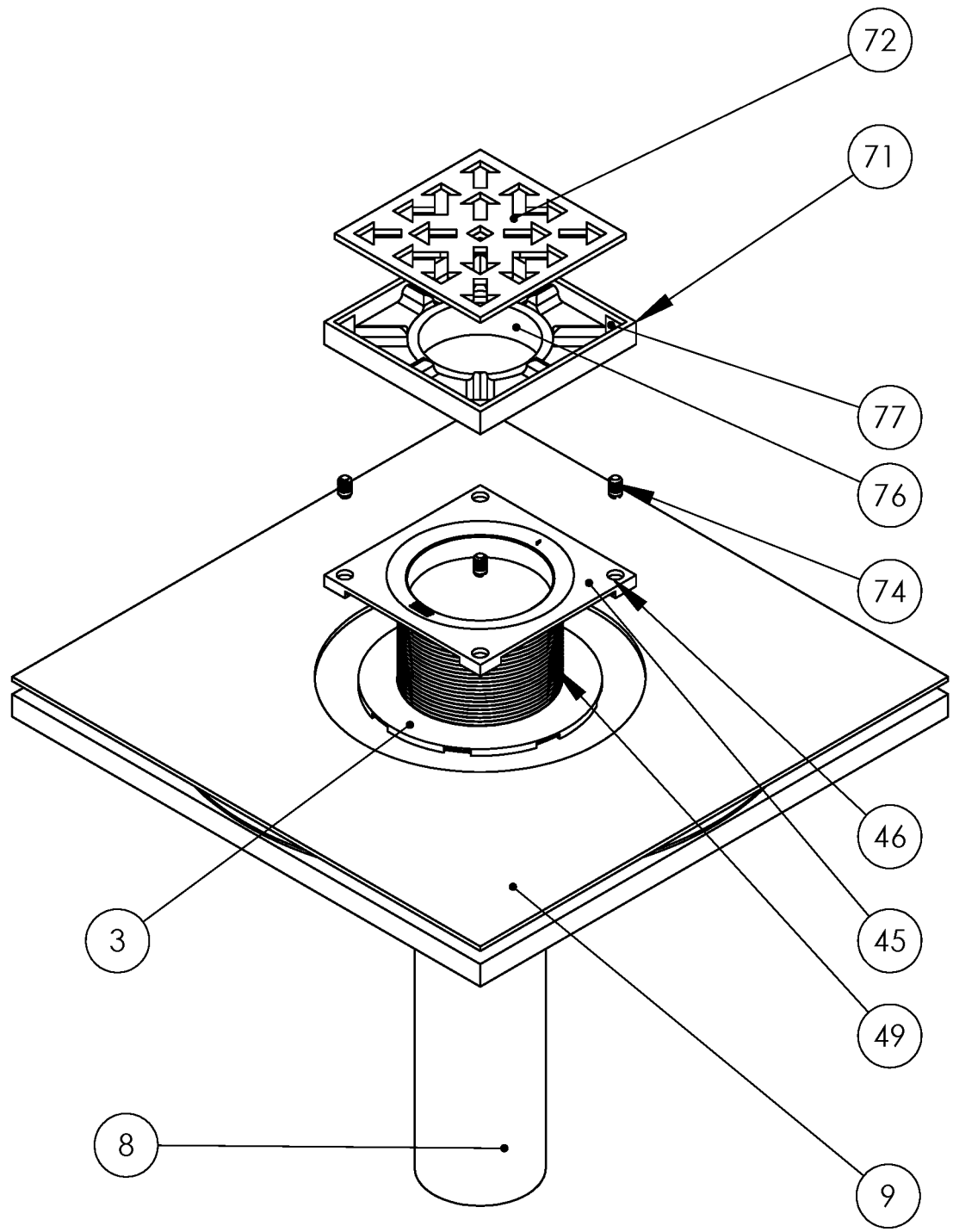
FIG. 10 is an isometric view of the membrane adapter saucer mounted to the subfloor. In this instance the grate is replaced with a grate subassembly with grate borders. The tilt of the grate can be micro-adjusted with set screws.

FIG. 10 shows the same assembly as in FIG. 9 in an exploded isometric view, revealing the same parts as FIG. 9 as well as features of the grate support 49 including a square grate support flange 45 and seats 46 for tilt adjustment screws 74 allowing tilt of the grate border 71, in turn tilting the grate 72 surface because the grate rests on internal grate mounts 77 in the grate border 71 part. Grate perforations 72 drain surface water through a central perforation 76 of the grate border 71 part and downstream into the internal drainage passages of the grate support 49, the cup 3, the membrane adapter saucer 1, and the downstream piping 8.

The invention claimed is:

1. A wet room surface drain assembly comprising:
   a saucer shaped membrane adapter configured to be mounted to a subfloor, the saucer shaped membrane adapter comprising an upstream flange, and downstream of the upstream flange a central perforated receptacle for downward penetration of a hole in the subfloor, and
   a perforated grate support cup configured to support a grate support,
   wherein:
   the perforated grate support cup is configured to rest upon a radial flange interior to a downstream end of the central perforated receptacle of the saucer shaped membrane adapter, and
   the upstream flange of the saucer shaped membrane adapter is configured to adhere to a liquid or solid membrane disposed on a wet room floor to provide a waterproof connection from the membrane to a drain provided in the wet room floor.

2. The drain assembly of claim 1, wherein:
   the grate support can be threaded into the perforated grate support cup to provide a grate surface coplanar with an upper surface of tiles disposed on a surface of the subfloor.

3. The drain assembly of claim 1, wherein:
   the central perforated receptacle of the saucer shaped membrane adapter is circular, and comprises a circumference larger than circumference of the perforated grate support cup, allowing the grate support cup and a grate supported by the grate support cup to be moved in any horizontal direction within the confines of the circular receptacle.

* * * * *